(12) United States Patent
Kristoffersen et al.

(10) Patent No.: US 10,107,259 B2
(45) Date of Patent: Oct. 23, 2018

(54) CONTROL METHOD FOR A WIND TURBINE, AND WIND TURBINE

(71) Applicant: VESTAS WIND SYSTEMS A/S, Aarhus N (DK)

(72) Inventors: Jacob Krogh Kristoffersen, Viby J (DK); Asger Svenning Andersen, Tjele (DK); Søren Sørensen, Aarhus N (DK); Lars Risager, Ry (DK)

(73) Assignee: VESYAS WIND SYSTEMS A/S, Aarhus N (DK)

( * ) Notice: Subject to any disclaimer, the term of this patent is extended or adjusted under 35 U.S.C. 154(b) by 771 days.

(21) Appl. No.: 14/366,897

(22) PCT Filed: Dec. 14, 2012

(86) PCT No.: PCT/DK2012/050464
§ 371 (c)(1),
(2) Date: Jun. 19, 2014

(87) PCT Pub. No.: WO2013/091638
PCT Pub. Date: Jun. 27, 2013

(65) Prior Publication Data
US 2014/0377064 A1    Dec. 25, 2014

Related U.S. Application Data

(60) Provisional application No. 61/577,688, filed on Dec. 20, 2011.

(30) Foreign Application Priority Data

Dec. 20, 2011 (DK) ................................ 2011 70732

(51) Int. Cl.
*F03D 7/02* (2006.01)
*F03D 7/04* (2006.01)

(52) U.S. Cl.
CPC ........... *F03D 7/0224* (2013.01); *F03D 7/044* (2013.01); *F05B 2270/322* (2013.01);
(Continued)

(58) Field of Classification Search
None
See application file for complete search history.

(56) References Cited

U.S. PATENT DOCUMENTS 5,995,880 A * 11/1999 Larramendy ........ G05D 1/0623
                                                    244/181
6,619,918 B1    9/2003 Rebsdort
(Continued)

FOREIGN PATENT DOCUMENTS

DK    201070273 A    12/2011
WO    2011/157272 A2    12/2011
(Continued)

OTHER PUBLICATIONS

George Marsh, Intelligent wind turbine blade monitoring, [retrieved on Jan. 20, 2017] retrieved from the Internet: <URL: http://www.renewableenergyfocus.com/view/3455/intelligent-wind-turbine-blade-monitoring-the-benefits/>.*
(Continued)

*Primary Examiner* — Kenneth M Lo
*Assistant Examiner* — Istiaque Ahmed
(74) *Attorney, Agent, or Firm* — Patterson + Sheridan, LLP (57) ABSTRACT

The invention relates to a method of controlling a wind turbine comprising one or more blades attached to a rotor hub, the one or more blades being arranged to pitch relative to the hub, the method comprising the steps of obtaining a blade load signal comprising data on an absolute load on the one or more blades; processing the blade load data to detect a high thrust wind event, and generating a control signal
(Continued)

comprising a pitch contribution for affecting the blades to pitch out of the wind in response to the detected wind event. The invention also relates to a wind turbine, a control system for a wind turbine and a computer program product being adapted to enable a computer system to perform the method of the invention.

17 Claims, 6 Drawing Sheets

(52) U.S. Cl.
CPC ... *F05B 2270/331* (2013.01); *F05B 2270/808* (2013.01); *Y02E 10/723* (2013.01)

(56) References Cited

U.S. PATENT DOCUMENTS

| | | | |
|---|---|---|---|
| 2002/0047275 A1 | 4/2002 | Wobben | |
| 2007/0041837 A1 | 2/2007 | Ide et al. | |
| 2007/0057517 A1* | 3/2007 | McNerney | F03D 7/0224 290/44 |
| 2007/0216166 A1* | 9/2007 | Schubert | F03D 7/0224 290/55 |
| 2009/0060740 A1 | 3/2009 | Stiesdal et al. | |
| 2009/0078052 A1* | 3/2009 | Twerdochlib | G01H 1/08 73/660 |
| 2009/0129924 A1 | 5/2009 | Rebsdort et al. | |
| 2010/0135787 A1* | 6/2010 | Scholte-Wassink | F03D 7/0212 416/1 |
| 2011/0229300 A1* | 9/2011 | Kanev | F03D 7/0224 415/1 |
| 2011/0280722 A1 | 11/2011 | Stiesdal | |

FOREIGN PATENT DOCUMENTS

| | | |
|---|---|---|
| WO | 2012/044161 A2 | 4/2012 |
| WO | WO 2012044161 A2 * | 4/2012 |

OTHER PUBLICATIONS

International Search Report for PCT/DK2012/050464, dated Apr. 8, 2013.
Danish Search Report for PA 2011 70732, dated Jul. 12, 2012.

* cited by examiner

CONTROL METHOD FOR A WIND TURBINE, AND WIND TURBINE

FIELD OF THE INVENTION

Embodiments of the invention generally relate to control method for a wind turbine, a wind turbine, a control system for a wind turbine and a computer program product being adapted to enable a computer system to perform the method of the invention.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines generators may be arranged together in a wind park or wind power plant to generate sufficient energy to support a grid. The rotor comprises one or more blades attached to a rotor hub. Each of the blades may be arranged to pitch relative to the hub, along a longitudinal axis of the blade.

Most modern wind turbines are controlled and regulated continuously, most often with the purpose of ensuring maximum power extraction from the wind under the current wind, and weather, while at the same time ensuring that the loads on the different components of the wind turbine are at any time kept within acceptable limits. Desirably, the wind turbine may also be controlled to account for fast sudden changes in the wind velocity the so-called wind gusts, and take into account the dynamic changes in the loads on the individual blades due to e.g. the passing of the tower, or the actual wind velocity varying with the distance to the ground (the wind profile or shear).

To this purpose a number of parameters are collected and monitored by the controllers in a wind turbine, such as for instance the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The current performance, and thereby the power production and the load situation of the wind turbine is primarily controlled by controlling the pitch angles of the blades, but may further include adjusting for instance any different active aerodynamic devices for changing the aerodynamic surfaces of the blades such as flaps or vortex generating means, adjusting the power, and/or adjusting the rotational speed of the rotor.

SUMMARY OF THE INVENTION

Embodiments of the invention generally relate to a control method for a wind turbine which enables an early and robust detection of high thrust wind events. Thus, the control method of the invention enables a high load reduction on the blades and tower of the wind turbine, with low impact on pitch loads and/or annual energy production of the wind turbine.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention provides a method of controlling a wind turbine comprising one or more blades attached to a rotor hub, the one or more blades being arranged to pitch relative to the hub, the method comprising the steps of obtaining a blade load signal comprising data on an absolute blade load on the one or more blades, processing the blade load signal to detect a high thrust wind event, and generating a control signal comprising a pitch contribution for affecting the blades to pitch out of the wind in response to the detected coherent wind event. The high thrust wind event detected may be any wind event providing a high thrust on the rotor of the wind turbine by increasing the loading on two or more blades of the wind turbine. Examples of such a high thrust wind event may be a coherent or substantially coherent wind gust, an extreme wind or any other wind event providing a rapid increase in the loading on a substantial part of or the entire rotor plane, viz. on two or more of the blades of the wind turbine. Hereby, is obtained a method for detecting a high thrust wind event quickly due to the absolute load sensors, which are considered to enable earlier and more robust detection of wind events compared to measurements performed with non-absolute blade load sensors. Control concepts that control the blades of a wind turbine individually may not be designed to address load reduction on the wind turbine and its components in case of high thrust wind events reaching all the blades of the wind turbine sufficiently. The control method of the invention addresses reduction of the rotor thrust and with that tower loads during high thrust wind events, due to a relatively high correlation between the loading of the blades and the actual rotor thrust and tower bottom bending moment.

Preferably, the step of obtaining a blade load signal comprises measuring the absolute blade load by means of an absolute blade load sensor on the one or more blades. Alternatively, the step of obtaining a blade load signal comprises estimating the absolute blade load on the basis of a load sensor on the one or more blades. There may be more than one absolute blade load sensor, for example the wind turbine may comprise three blades each having one absolute blade load sensor. In this case is preferable that the distance from the hub to the absolute blade load sensor at a blade is substantially equal to the distance from the hub to the absolute load sensor at the other blade(s). In case more than one blade comprises more than one absolute blade load sensor, it is advantageous that the distance from the hub to the sensors are substantially the same at the different blades having more than one sensor.

Preferably each blade may comprise one or more absolute load sensors; however, in case the wind turbine comprises more than two blades, it is not imperative that all blades have an absolute load sensor.

The step of detecting a high thrust wind event of the method of the invention comprises obtaining a load sum signal indicative of the sum of the blade load moments of the one or more blades of the wind turbine and comparing the load sum signal and/or one or more signals derived from the load sum signal to one or more reference load thresholds. The load sum is a sum of the absolute blade loads from the blade load signal on the one or more blades. In case of a wind turbine having three blades and the blade load signal comprising data on the absolute blade load of all three blades, the load sum is the sum of the absolute blade loads from the three blades. This load sum has a high correlation with the actual rotor thrust and tower bottom bending moment and is thus indicative for the load on the rotor and tower. The pitch contribution may be determined based on P, PI or PID control.

Preferably, the one or more reference load thresholds comprise(s) a first load threshold, wherein the first load threshold is used to indicate that no event is detected. The one or more signals derived from the load sum may be the mean and/or the standard deviation of the sum of the load signals.

The step of detecting is arranged for an early detection of high thrust wind events, such as e.g. wind gusts. A simple hypothesis test may determine whether a high thrust wind event is detected or not, by comparing the load sum and/or one or more signals derived from the load sum the first load threshold.

Moreover, the one or more reference load thresholds comprise a second load threshold, wherein the second threshold is used to indicate the detection of an event.

Furthermore, the one or more reference load threshold comprise a third threshold derived from the second threshold, the third threshold being lower than the second threshold, wherein the third threshold is used to indicate the end of detection of an event. The third load threshold may be a fraction of the second load threshold, and may be calculated by multiplying a factor between 0 and 1 to the second load threshold. By using a lower load threshold for detecting the end of a high thrust wind event compared to the threshold used to detect the beginning of the high thrust wind event, it is ensured that the indication of an ongoing wind event will last somewhat longer than would otherwise have been the case. Hereby, the initiation of the pitching of the blades back into the wind will wait somewhat longer than would otherwise have been the case. This is advantageous in that, upon pitching out of the wind upon indication of a wind event, typically the loads on the blades may be in control before the tower bottom bending moment; by waiting a bit before pitching back into the wind after a high thrust wind event or gust event, the loading of the tower may be reduced.

The step of generating a control signal of the method of the invention comprises generating a first pitch contribution in case a high thrust wind event is detected and generating a second pitch contribution upon detection of end of a high thrust wind event. Hereby, the pitch contribution in the time after the occurrence of a high thrust wind event and after the indication that the wind event has terminated may ensure a smooth transition in the pitching of the blades after a high thrustwind event.

The step of generating the second pitch contribution comprises comparing the blade load signal and/or a second signal derived from the blade load signal with the second load threshold. Thus, if the blade load signal indicates that the blade load is well below the threshold, the reduction in the pitch contribution may be quick, whilst if the blade load signal indicates that the blade load is only slightly below the threshold, the reduction in the pitch contribution may be slower.

The overall pitch control of the wind turbine may be collective pitching or individual pitching. However, the pitch contribution may be a collective pitch contribution sent to each of the one or more blades.

The steps of the method of the invention may be repeated regularly or continuously. Hereby, the method performs a monitoring of the loads on the blade of the wind turbine.

The method may further comprise the step of dispatching the determined pitch contribution to a pitch actuation system. The pitch contribution may be determined as a function of the gradient of the blade sensor data.

Another embodiment of the invention provides a wind turbine comprising one or more blades attached to a rotor hub, the one or more blades being arranged to pitch relative to the hub; wherein one or more of the blades comprise(s) a load sensor for providing a blade load signal on an absolute load on the blade, a load control system arranged for processing the blade load data load to detect a high thrust wind event, and arranged for generating a control signal comprising a pitch contribution for affecting the blades to pitch out of the wind in response to the detected high thrust wind event. The turbine presents similar advantages as those described in relation to the method of the invention.

Preferably, the load control system comprises a P-, PI or PID-controller.

In one embodiment, wherein the load sensor is an absolute load sensor, such as a calibrated and temperature compensated optical strain gauge. However, alternatively, the blade load signal on the absolute load on the blade emanates from an estimation based on the load sensor output.

In one embodiment of the wind turbine of the invention, each of the one or more blades of the wind turbine comprises an absolute blade load sensor placed at the same distance to the hub. Hereby is ensured that data from one blade may be directly comparable to data measured by another blade.

The following is a detailed description of embodiments of the invention depicted in the accompanying drawings. The embodiments are examples and are in such detail as to clearly communicate the invention.

However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
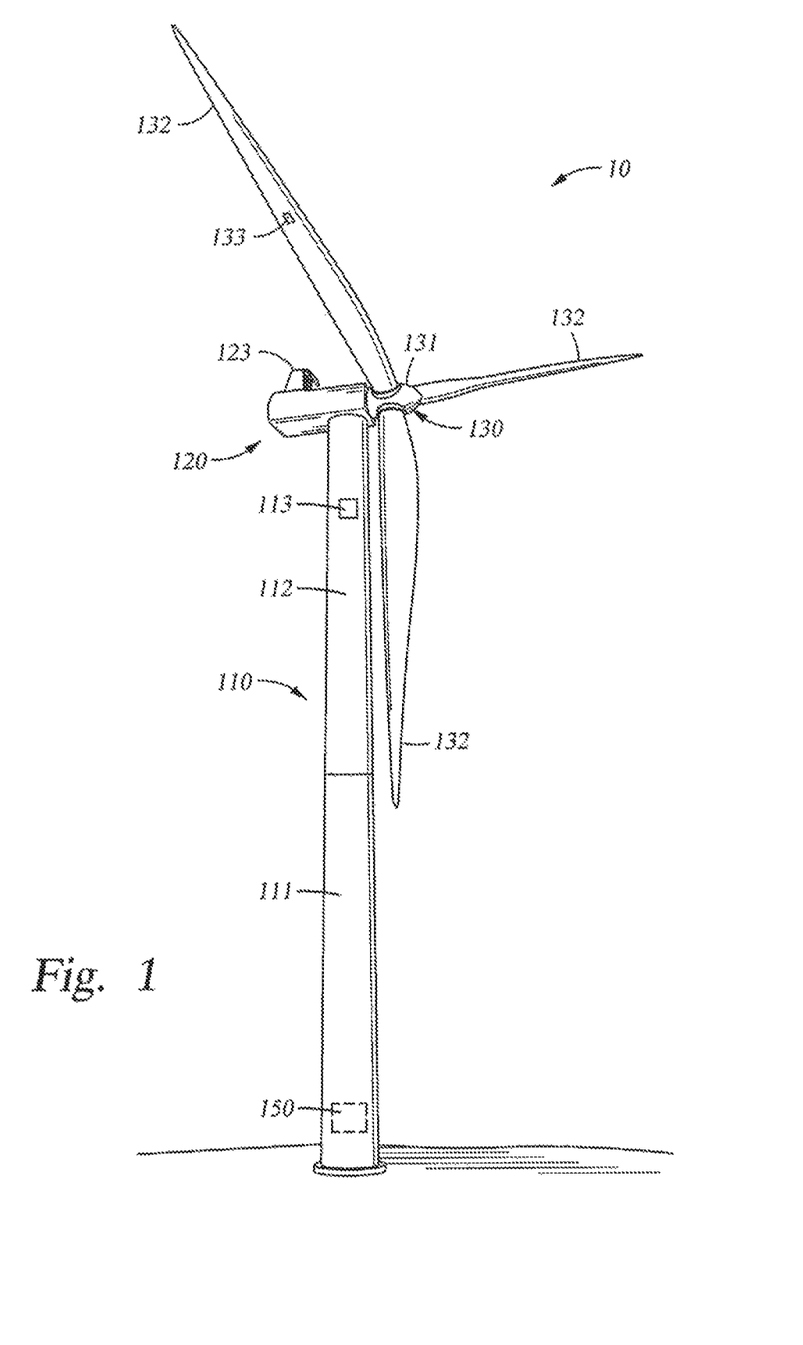
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at pre-defined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

The wind turbine 100 may include a plurality of sensors for monitoring a plurality of parameters associated with, for example, environmental conditions, wind turbine loads, performance metrics, and the like. For example, a strain gauge 133 is shown on the blade 132. In one embodiment, the strain gauge 133 may be configured to detect bending and or twisting of the blades 132. The information regarding bending and twisting of the blades may be necessary to perform one or more operations that reduce the loads on the blades 132 that may occur, for example, during high turbulence or high wind gusts. In such situations, the blades may be pitched to reduce the loads, thereby preventing damage to the blades.

FIG. 1 also illustrates an accelerometer 113 that may be placed on the tower 110. The accelerometer 113 may be configured to detect horizontal movements and bending of the tower 110 that may be caused due to the loads on the wind turbine 100. The data captured by the accelerometer 113 may be used to perform one or more operations for reducing loads on the wind turbine 100. In some embodiments of the invention, the accelerometer 113 may be placed on the nacelle 120. However, in some embodiments of the invention, no accelerometer 113 is placed on the tower.

FIG. 1 also depicts a wind sensor 123. The wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may also detect a speed of the wind. Wind speed data may be used to determine an appropriate pitch angle that allows the blades 132 to capture a desired amount of energy from the wind. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100.

While a strain gauge 133, accelerometer 113, and wind sensor 123 are described herein, embodiments of the invention are not limited to the aforementioned types of sensors. In general, any type and number of sensors may be placed at various locations of the wind turbine 100 to facilitate capturing data regarding structural health, performance, damage prevention, acoustics, and the like. For example, a pitch angle sensor may be placed at or near a wind turbine blade to determine a current pitch angle of the blade.

Figure 2:
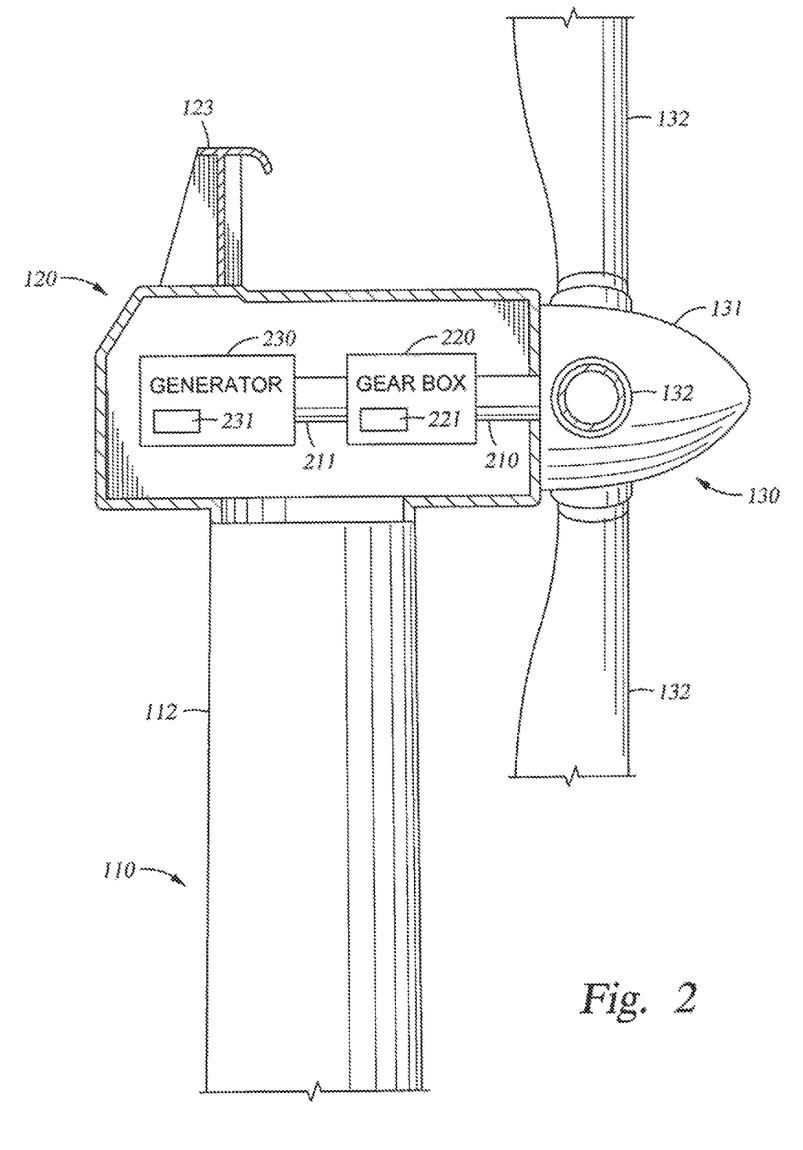
FIG. 2 illustrates a more detailed view of a nacelle according to an embodiment of the invention.

FIG. 2 illustrates a more detailed view of a nacelle 120 according to an embodiment of the invention. As illustrated in FIG. 2, the nacelle 120 may include at least a low speed shaft 210, a high speed shaft 211, a gearbox 220, and a generator 230. In one embodiment, the low speed shaft 210 may couple the gearbox 230 to the hub 130, as illustrated in FIG. 2. The gearbox 220 may rely on gear ratios in a drivetrain to provide speed and torque conversions from the rotation of the low speed shaft 210 to the rotor assembly of the generator 230 via the high speed shaft 211.

In an alternative embodiment, the low speed shaft 210 may directly connect the hub 130 with a rotor assembly of the generator 230 so that rotation of the hub 130 directly drives the rotor assembly to spin relative to a stator assembly of the generator 230. In embodiments where the low speed shaft 210 is directly coupled to the hub 130, the gear box 220 may not be included, thereby allowing the nacelle 120 to be smaller and/or lighter.

The generator 230 may be configured to generate a three phase alternating current based on one or more grid requirements. In one embodiment, the generator 230 may be a synchronous generator. Synchronous generators may be configured to operate at a constant speed, and may be directly connected to the grid. In some embodiments, the generator 230 may be a permanent magnet generator. In alternative embodiments, the generator 230 may be an asynchronous generator, also sometimes known as an induction generator. Induction generators may or may not be directly connected to the grid. For example, in some embodiments, the generator 230 may be coupled to the grid via one or more electrical devices configured to, for example, adjust current, voltage, and other electrical parameters to conform with one or more grid requirements. Exemplary electrical devices include, for example, inverters, converters, resistors, switches, transformers, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention.

In some embodiments, a plurality of sensors may be included in the nacelle 120 to monitor the structural health and performance of the components therein, the quality of the power generated, and the like. For example, a sensor 221 may be placed in the gear box 220 to detect mechanical strain and wear/tear of the gear box 220. A sensor 231 may be placed in the generator 230 to detect generator speed, power generation, or the like.

Figure 3:
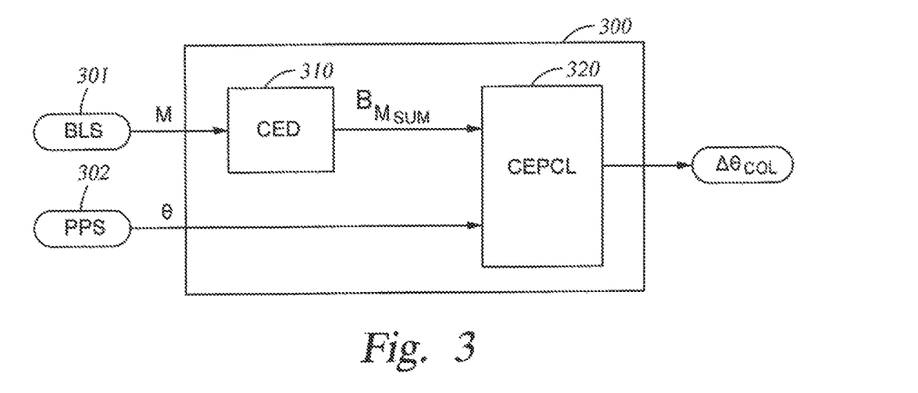
FIG. 3 is a schematic illustration of a control system according to an embodiment of the invention.

FIG. 3 is a schematic illustration of an exemplary control system 300 according to an embodiment of the invention. The control system 300 is preferably located within a wind turbine 100, e.g. in the hub 131, in the nacelle 120 or in the tower 110. As mentioned in connection with FIGS. 1 and 2, the wind turbine 100 comprises one or more blades 132. In this embodiment, the one or more of the blades 132 each comprises an absolute load sensor BLS 301 (not shown in FIG. 1) for obtaining the absolute blade load of the blade on which the sensor is located. Moreover, the one or more of the blades 132 each comprises a pitch position sensor PPS 302 (not shown in FIG. 1) for obtaining pitch position data on the blade on which the sensor is located. Alternatively, the absolute load could be estimated from relative load sensors or other relevant measurement means of the wind turbine.

The control system 300 is arranged for processing the absolute blade load from the blade load sensor(s) 301 and the pitch position data from the pitch position sensor(s) 302 in order to provide a pitch contribution for affecting the blades to pitch out of the wind in response to the detected high thrust wind event, as will be described below. Preferably, each of the blades 132 of the wind turbine comprises an absolute blade load sensor 301; in case of a wind turbine with more than one blade, the absolute blade load sensors 301 of the different blades 132 are placed at similar distances to the hub in order to make absolute blade load from one blade comparable to absolute blade load measured by absolute the blade load sensor 301 of another blade. It is also conceivable that more than one absolute blade load sensor 301 is mounted in or at each blade; in this case it is also preferred that the absolute blade load sensors 301 of a first blade are located at substantial equal distances to the hub as the distances from between the hub and the absolute blade load sensors 301 of the other blade(s).

The control system comprises a subsystem CED 310 for collective event detection and another subsystem CEPCL 320 for collective event pitch contribution learning.

The control system 300 is arranged to receive input data from the absolute blade load sensors BLS 301. The absolute blade load sensors 301 are preferably absolute blade flap root bending moment sensors, for example fiber optical load sensors with temperature compensation, arranged for providing absolute blade load measurements. The output of the absolute blade load sensors 301 is input as a blade root bending moment vector M to the collective event detection subsystem 310. In the case where the wind turbine 100 comprises three blades 132, the blades being denoted as A, B and C, the blade root bending moment vector M contains three blade root moment components, $M_A$, $M_B$ and $M_C$. As it will be described in more detail in connection with FIG. 4, the collective event detection subsystems 310 processes the data in the blade root bending moment vector M in order to output a binary event signal $B_{Msum}$ indicating whether an event is detected or not. The binary event signal $B_{Msum}$ is input to the collective event pitch contribution learning subsystem 320, the subsystem 320 also being arranged to receive a pitch position input θ from the pitch position sensors PPS 302 of the blades. In the case where the wind turbine 100 comprises three blades, A, B and C, the pitch position input θ is a vector containing three pitch position components, $θ_A$, $θ_B$ and $θ_C$.

As it will be described in more detail in relation to FIG. 7, the collective event pitch contribution learning subsystem 320 processes the binary event signal $B_{Msum}$ and the pitch position sensor input θ in order to provide a pitch contribution $Δθ_{Col}$ for affecting the blades to pitch out of the wind in response to the detected high thrust wind event. The pitch contribution may be a collective pitch contribution arranged to be sent to a pitch activator of each blade, in that a high thrust wind event typically influences the blades substantially similarly.

Figure 4:
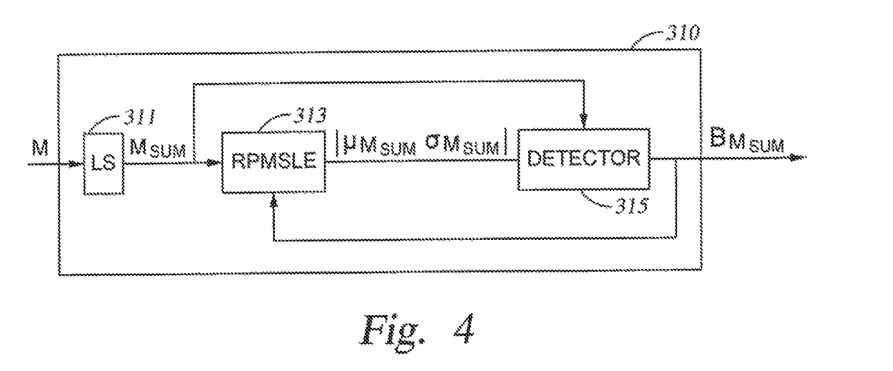
FIG. 4 is a schematic drawing of a subsystem of the control system shown in FIG. 3.

FIG. 4 is a schematic drawing of the collective event detector subsystem 310 of the control system shown in FIG. 3. A purpose of the collective event detector subsystem 310 is to enable early detection of high thrust wind events, such as gusts, in order to enable optimization of load reduction during high thrust wind events, such as gusts, without compromising the overall energy production from the wind turbine or the pitch system loads.

The collective event detector subsystem 310 comprises a load sum component 311, a rotor plane moment sum load estimation component RPMSLE 313 and a detection component 315, as will be described in the following. The load sum component 311 receives the bending moment vector M and provides a signal $M_{sum}$ on the sum of absolute blade moments for the three blades A, B and C. The correlation between the absolute blade moment signal $M_{sum}$ and the actual rotor thrust and/or the tower bottom bending moment is relatively high, and thus the absolute blade moment signal $M_{sum}$ is useful in the detection of loads from high thrust wind events. The absolute blade moment signal $M_{sum}$ is input to the rotor plan moment sum load estimation component 313 as well as to the detection component 315.

The rotor plane moment sum load estimation component 313 is arranged for determining the mean $μ_{Msum}$ and the standard deviation $σ_{Msum}$ of the sum of the blade flap moment $M_{sum}$. At each time step, the mean $μ_{Msum}$ and the standard deviation $σ_{Msum}$ of the sum of the blade flap moment $M_{sum}$ are estimated and updated.

In this way an envelope of the blade flap moment sum $M_{sum}$ for normal operation, i.e. expected blade flap moment sum, is maintained from which deviations can be detected. The estimation of $μ_{Msum}$ and $σ_{Msum}$ may for example be done by means of exponential averaging:

$$μ_{Msum}(n) = B_{Msum} \frac{T}{τ_{Load}} M_{sum}(n) + \left(1 - B_{Msum} \frac{T}{τ_{Load}}\right) μ_{Msum}(n-1)$$

-continued $$\psi_{Msum}(n) = B_{M_{Sum}} \frac{T}{\tau_{Load}} M_{sum}^2(n) + \left(1 - B_{M_{Sum}} \frac{T}{\tau_{Load}}\right) \psi_{Msum}(n-1)$$

$$\sigma_{Msum}(n) = \sqrt{\psi_{Msum}(n) - \mu_{Msum}^2(n)}$$

It should be noted that the output of the collective event detector subsystem 310, viz. the binary event signal $B_{M_{sum}}$, is also input to the pitch plane moment sum load estimation component 313. The reason for this is that the $\mu_{Msum}$ and $\sigma_{Msum}$ should not be updated when an event is detected due to the fact the event detection hold scheme described in the following would not be valid if this was the case. Thus, if the flap moment data was used during the events, $\mu_{Msum}$ and $\sigma_{Msum}$ and consequently an absolute blade moment sum threshold would increase significantly.

The output of the rotor plane moment sum load estimation component 313, viz. the mean $\mu_{Msum}$ and standard deviation $\sigma_{Msum}$ of the blade flap moment $M_{sum}$, is input to the detection component 315 of the collective event detector subsystem 310. The operation of the detection component 315 is described further in connection with FIG. 5. As mentioned above the output of the detection component 315 is the binary event signal $B_{Msum}$ indicating whether a high thrust wind event is detected or not.

Figure 5:
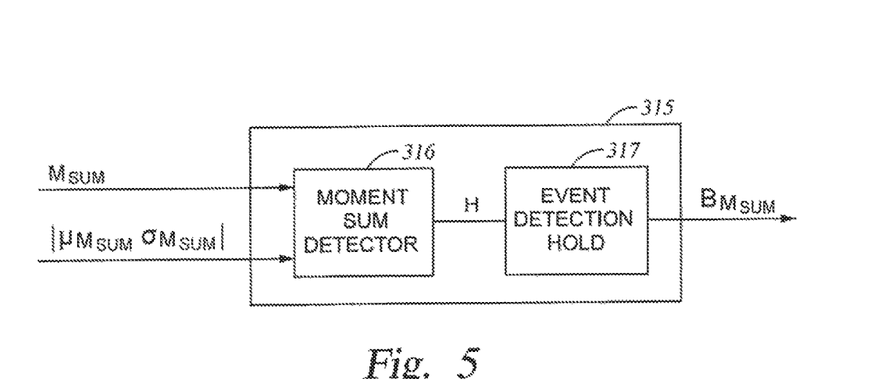
FIG. 5 is a schematic drawing of the detection component of the collective event detector subsystem of the control system shown in FIG. 4.

FIG. 5 is a schematic drawing of the detection component 315 of the collective event detector subsystem 310 of the control system shown in FIG. 3. The detection component 315 comprises a moment sum detector component 316 and an event detection hold component 317. The input to the moment sum detector component 316 is the input signals to the detection component 315 as shown in FIG. 4, viz. the absolute blade moment signal $M_{sum}$ as well as the mean $\mu_{Msum}$ and the standard deviation $\sigma_{Msum}$ of the sum of the blade flap moment $M_{sum}$.

The output of the moment sum detector component 316 is an indication H of whether a high thrust wind event is being detected or no high thrust wind event is being detected. The moment sum detector component 316 is arranged to enable an early detection of high thrust wind events. For example, the moment sum detector may include three different moment thresholds defined as:

$$T_{MS1} = M_{Sum,Min}$$

$$T_{MS2} = \mu_{M_{sum}} + N_{M_{sum}\sigma}(\mu_{M_{sum}}) \cdot \max(\sigma_{M_{sum},min}, \sigma_{M_{sum}})$$

$$T_{MS3} = M_{Sum,Max}(\mu_{M_{sum}})$$

A simple hypothesis test may determine whether an event is not detected, corresponding to the hypothesis result $H_0$, or an event is detected, corresponding to the hypothesis result $H_1$. The hypothesis test may be run continuously, or e.g. when a blade passes through certain sector of the rotor plane, and is defined as:

No Event: $H_{0,s}$: $M_{Sum} \leq T_{MS1}$

Event: $H_{1,s}$: $M_{Sum} > \min(T_{MS2}, T_{MS3})$

The first threshold $T_{MS1}$ is a minimum moment limit $M_{Sum,min}$ set in order to minimized the number of false high thrust wind event detections.

The second threshold $T_{MS2}$ is set in order to give an estimate of the normal operation load envelope.

A gain scheduling of $N_{M_{min}\sigma}$ with $\mu_{M_{sum}}$ is included to minimize the number of false high thrust event detection alarms. $N_{M_{sum}\sigma}$ denotes the number of standard deviations which defines the width of the band around the mean value that defines normal operation. The number of standard deviations normally lies around one to six, but could be higher. The allowable width of the band is dependent on mean value to adapt the sensitivity to low risk load level and high risk load level. When the mean blade moment is low the load envelope can be relatively large as opposed to a situation where the mean blade moment is high, without increasing the risk of high extreme loads significantly.

A minimum standard deviation $\sigma_{M_{sum},min}$ is included to set a lower limit on the load envelope. Otherwise, the number of false high thrust wind event detections in low turbulence (low standard deviation) would increase significantly.

The third threshold $T_{MS3}$ is included to enable early detection of wind events in e.g. high turbulence, when the standard deviation of the blade flap moment is relatively high. This situation would give a relatively late detection due to the threshold $T_{MS2}$. Hence, this threshold includes a degree of freedom for load optimization.

The output H of the moment sum detector component 316 is the result of the hypothesis test on whether a high thrust wind event is detected or not, as described above. This hypothesis test result H is input to the event detection hold component 317, the function whereof is described further in connection with FIG. 6. As mentioned above the output of the detection component 317 is the binary event signal $B_{Msum}$ indicating whether a high thrust wind event is detected or not.

Figure 6:
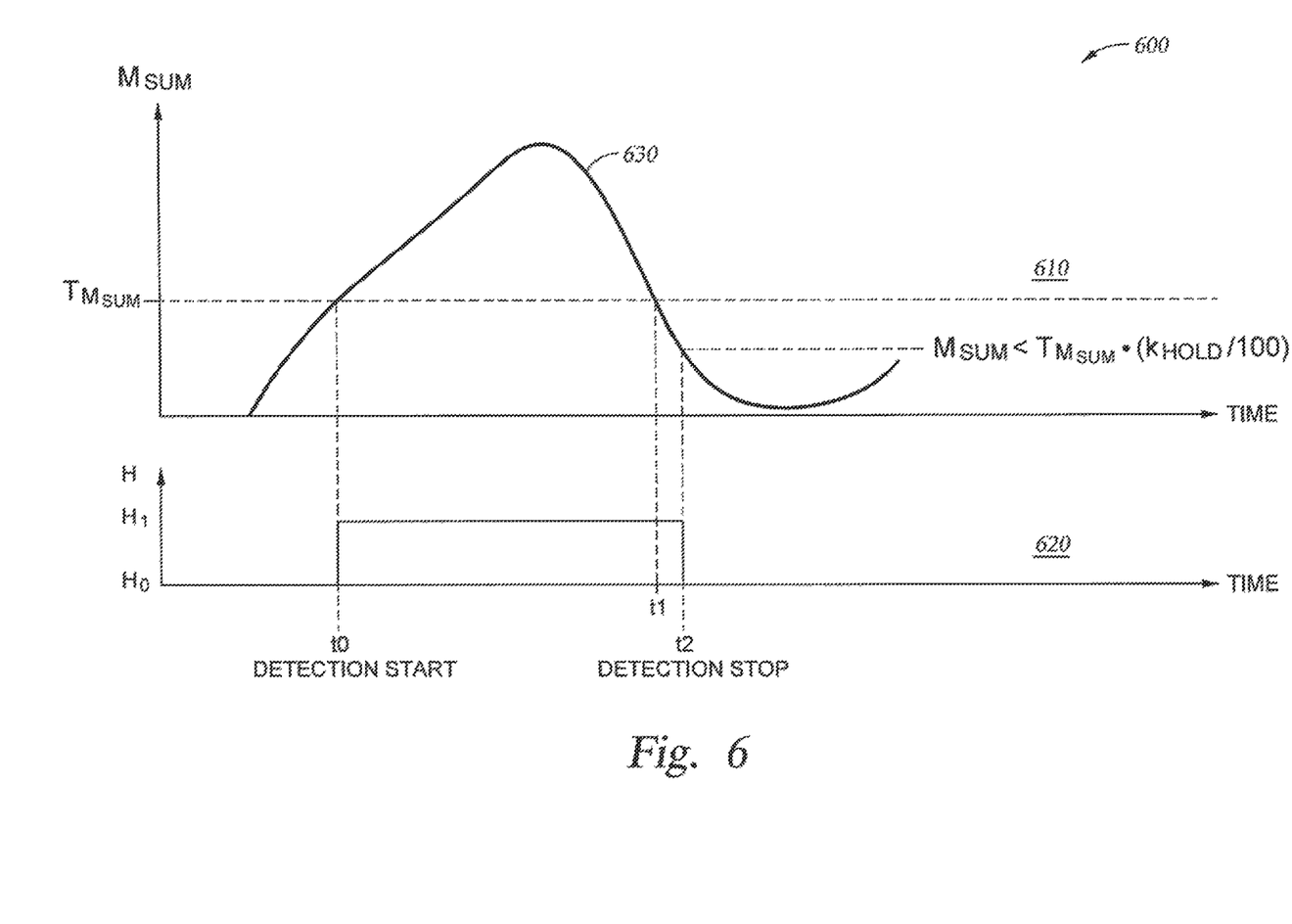
FIG. 6 is a graph illustrating an event detection hold scheme.

FIG. 6 is a graph 600 illustrating an event detection hold scheme. The graph 600 contains two sub-graphs, 610 and 620, whereof the uppermost sub-graph 610 illustrates the sum of absolute blade moments $M_{sum}$ for the three blades of the wind turbine as a function of time, whilst the sub-graph lowermost 620 illustrates the result H of the hypothesis test described in relation to FIG. 5 as a function of time.

In the graph 610 the curve 630 illustrates an example of the sum of absolute blade moments $M_{sum}$ for the three blades of the wind turbine as a function of time. At the time $t_1$ the sum of absolute blade moments $M_{sum}$ for the three blades reaches a threshold, viz. the second load threshold $T_{Msum}$ being determined as:

$$T_{M_{sum}} = \max(T_{MS1} \min(T_{MS2}, T_{MS3}))$$

A sum of the absolute blade moments $M_{sum}$ exceeding this threshold indicates the detection of a high thrust wind event, which is indicated in the graph 620 in that the result of the hypothesis H is $H_1$ from the time $t_0$. Between the time $t_0$ and the time $t_1$, the sum of absolute blade moments $M_{sum}$ is above the second load threshold $T_{Msum}$ and the graph 620 indicates the detection of a high thrust wind event such as a gust event. At the time $t_1$, the sum of absolute blade moments $M_{sum}$ has decreased to be equal to the second load threshold; however, the event detection hold component 317 (shown in FIG. 5) is arranged for deriving a third threshold from the second threshold, the third threshold being lower than the second threshold. The third threshold in the case of FIG. 6 is indicated as $T_{Msum} \cdot (k_{hold}/100)$, where $k_{hold}$ is a constant between 0 and 100. The constant $k_{hold}$ can be adjusted to optimize the trade-off between loss of annual energy production, pitch system loads and the load reduction obtained by introducing the third load threshold. The curve 630 reaches the third threshold $T_{Msum} \cdot (k_{hold}/100)$ at the time $t_2$, resulting in the hypothesis H changing from Hypothesis $H_1$ indicating detection of high thrust wind event or gust event to Hypothesis $H_0$ indicating no high thrust wind event or no gust event.

As described above, by using a lower load threshold for detecting the end of a high thrust wind event compared to the threshold used to detect the beginning of the high thrust wind event, it is ensured that the indication of an on-going wind event will last somewhat longer than would otherwise have been the case. Hereby, the initiation of the pitching of the blades back into the wind will wait somewhat longer than would otherwise have been the case, in that the termination of the high thrust wind event is only detected at the time $t_2$ instead of being detected at the time $t_1$. This is advantageous in that, upon pitching out of the wind upon indication of a wind event, typically the loads on the blades may be in control before the tower bottom bending moment; by waiting a bit before pitching back into the wind after a high thrust wind event, the loading of the tower may be reduced.

Figure 7:
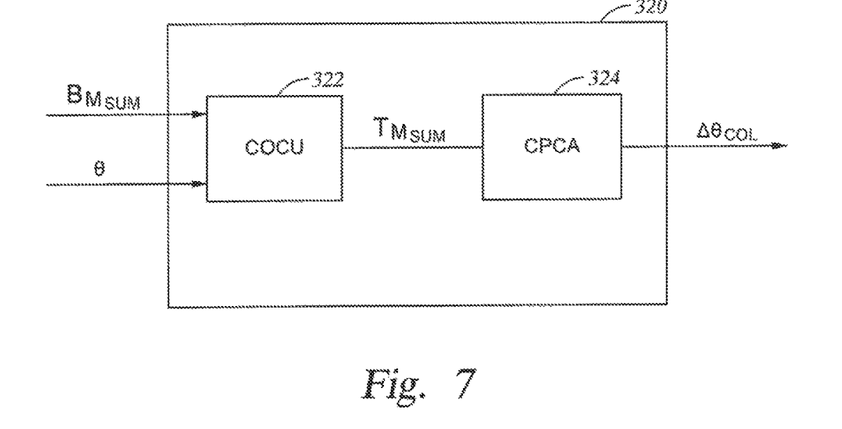
FIG. 7 is a schematic drawing of the subsystem for collective event pitch contribution learning of the control system shown in FIG. 3.

FIG. 7 is a schematic drawing of the subsystem CEPCL 320 for collective event pitch contribution learning of the control system 300 shown in FIG. 3.

The collective event pitch contribution learning subsystem 320 processes the binary event signal $B_{Msum}$ and the pitch position sensor input $\theta$ in order to provide a pitch contribution $\Delta\theta_{Col}$ for affecting the blades to pitch out of the wind in response to the detected wind event. The collective event pitch contribution learning subsystem 320 shown in FIG. 7 contains two sub-component, viz. a collective pitch contribution update component COCU 322 and a collective pitch contribution adaptation component CPCA 324. The functionalities of the collective pitch contribution update component COCU 322 is to provide settings of the collective pitch reference contribution upon the detection of a high thrust wind event, including during the transition from event detection to no event detection. The output of the collective pitch contribution update component COCU 322 is the second load threshold $T_{Msum}$, being determined as:

$$T_{M_{Sum}} = \max(T_{MS1}, \min(T_{MS2}, T_{MS3}))$$

This second load threshold $T_{Msum}$ is input to the collective pitch contribution adaptation component CPCA 324, that is arranged to determine a collective pitch contribution $\Delta\theta_{Col}$ as will be described in the following.

During detection of a high thrust wind event the collective pitch contribution $\Delta\theta_{Col}$ is a predetermined first pitch reference contribution or pitch reference offset $\Delta\theta$. However, at the time where the event detection indicates that the high thrust wind event detected is over, the collective pitch contribution $\Delta\theta_{DWG,Col}$ or pitch offset should be determined as:

$$\Delta\theta_{Req,Col} = \Delta\theta_{Col} - \tfrac{1}{3}(\theta_{A,stop} + \theta_{B,stop} + \theta_{C,stop}) - \tfrac{1}{3}(\theta_{A,start} + \theta_{B,start} + \theta_{C,start})$$

where
- $\Delta\theta_{A,start}$ and $\theta_{A,stop}$, respectively, is the measured pitch angle of blade A when the event is detected and when the detection is stopped, respectively;
- $\theta_{B,start}$ and $\theta_{B,stop}$, respectively, is the measured pitch angle of blade B when the event is detected and when the detection is stopped, respectively;
- where $\theta_{C,start}$ and $\theta_{C,stop}$, respectively, is the measured pitch angle of blade C when the event is detected and when the detection is stopped, respectively;
- $\Delta\theta_{Req,Col}$ is the required pitch angle to change from hypothesis $H_1$ to hypothesis $H_0$.

With this approach a smooth transfer of the pitch reference is enabled when the event detection indicates that a high thrust wind event has stopped.

Figure 8:
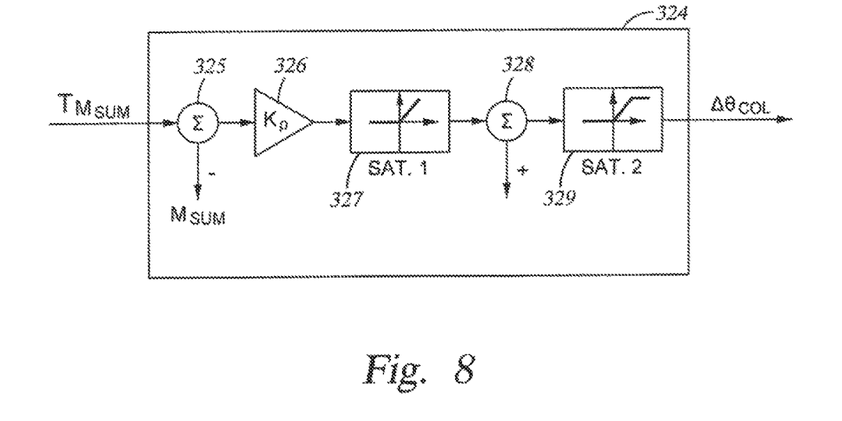
FIG. 8 is a schematic diagram of the collective pitch contribution adaptation of FIG. 7.

FIG. 8 is a schematic diagram of the collective pitch contribution adaptation component CPCA 324 of FIG. 7. In the example of FIG. 8, the collective pitch contribution adaptation component CPCA 324 is a P-controller. As mentioned in connection with FIG. 7, the input to the collective pitch contribution adaptation CPCA component 324 includes the second load threshold $T_{Msum}$. The collective pitch contribution adaptation CPCA component 324 comprises a comparator 325 arranged to compare the sum of absolute blade moments $M_{sum}$ and the second load threshold $T_{Msum}$.

The output of the collective pitch contribution adaptation CPCA component 324 is the collective pitch contribution $\Delta\theta_{Col}$. As mentioned in relation to FIG. 7, in case of detection of a high thrust wind event, the collective pitch contribution $\Delta\theta_{Col}$ is a predefined first pitch contribution $\Delta\theta$. In case of detection of the end of a high thrust wind event, the collective pitch contribution $\Delta\theta_{Col}$ is a second pitch contribution. Thus, if the absolute blade load indicates that the blade load is well below the second load threshold $T_{Msum}$, the reduction in the pitch contribution may be quick, whilst if the absolute blade load indicates that the blade load is only slightly below the threshold, the reduction in the pitch contribution may be slower.

The output from the comparator 325 is multiplied with a gain factor $K_p$ in gain component 326 and is input to a saturation block 327 arranged to secure that the output from the gain component 326 cannot become negative. A second comparator 328 is arranged to compare the output from the saturation block 327 to the collective pitch contribution $\Delta\theta_{Col(n-1)}$ obtained at a preceding time in order to determine the present collective pitch contribution $\Delta\theta_{Col}$. The output from the comparator 328 is input to a second saturation block 329 in order to avoid a negative result.

The collective pitch contribution adaptation component 324 is arranged to reduce the collective pitch contribution $\Delta\theta_{Col}$ to zero after it has been determined that a high thrust wind event has ended. The approach described in relation to FIG. 8 reduces the collective pitch reference offset dependent on the actual blade flap moment sum. If the blade moment sum is well below the second load threshold, it is considered to be safe to reduce the collective pitch reference offset fast. If the blade moment sum is only slightly below the second load threshold, the collective pitch reference offset should only be reduced slightly.

Hence, the hypothesis test indicating whether a high thrust wind event is detected (Hypothesis $H_1$) or not (Hypothesis $H_0$) or whether a transition from hypothesis $H_1$ to $H_0$ has taken place, may be described as (omitting the saturation blocks):

Event $H_1$: $\Delta\theta_{Col} = \Delta\theta$

Transition $H_1 \to H_0$: $\Delta\theta_{Col}(n) = \Delta\theta_{Req,Col}(n)$

No Event $H_0$: $\Delta\theta_{Col}(n) = \Delta\theta_{Col}(n-1) - K_p(T_{M_{Sum}}(n) - M_{sum}(n))$ where $\Delta\theta_{Req,Col}$ is the required pitch angle to change from a true hypothesis $H_1$ to a true hypothesis $H_0$. In the above formulas, "n" refers to the time steps. For example, if the time "n" is now, the time "n−1" is the previous time step. The $H_0$ formula refers to the decrease of the pitch contribution. The present pitch contribution (time step n) is equal to the pitch from last time step (n−1) subtracted a value dependent on the difference between actual load and expected load. This means that the pitch contribution is decreased dependent on reducing the load. That is, if the blades of the wind turbine have been pitched out and the measured load becomes lower than the expected load, the pitch offset should be removed.

Figure 9:
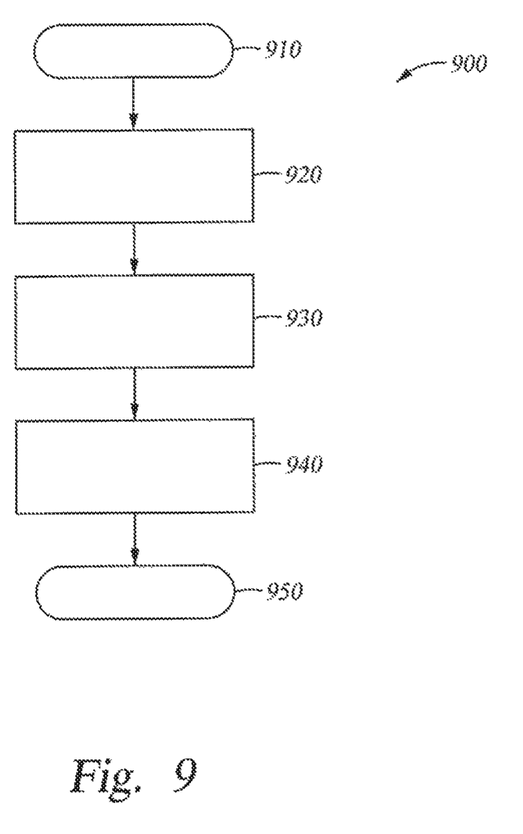
FIG. 9 shows a flow chart of an example of the method according to the invention

FIG. 9 shows a flow chart 900 of an example of the method according to the invention. The method 900 starts at step 910, and goes to step 920, wherein a blade load signal is obtained, either from one or more absolute load sensor on the one or more blades of from estimation of the absolute blade load of the one or more blades. In a next step, step 930, the blade load signal is processed to detect a high thrust wind event, and in a subsequent step, step 940, a control signal comprising a pitch contribution for affecting the blades to pitch out of the wind in response to the detected high thrust wind event is generated. The method stops at step 950.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of controlling a wind turbine comprising a plurality of blades attached to a rotor hub, the plurality of blades configured to pitch relative to the hub, the method comprising:
   receiving a blade load signal comprising blade load data on an absolute load on the plurality of blades,
   processing the blade load data to detect a high thrust wind event, wherein detecting the high thrust wind event comprises receiving a load sum signal indicative of a sum of blade load moments of the plurality of blades of the wind turbine and comparing at least one of the load sum signal and one or more signals derived from the load sum signal to reference load thresholds, wherein a first load threshold of the reference load thresholds sets a minimum moment limit for minimizing false high thrust detection, wherein a second load threshold of the reference load thresholds indicates a start of the high thrust wind event, and wherein a third load threshold of the reference load thresholds indicates an end of the high thrust wind event, wherein the third load threshold is derived from the second load threshold, and wherein the third load threshold is less than the second load threshold;
   generating, in response to the blade load data exceeding the second load threshold, a first control signal comprising a first pitch contribution for affecting the plurality of blades to pitch out of the wind; and
   generating, in response to the blade load data dropping below the third load threshold, a second control signal comprising a second pitch contribution affecting the plurality of blades to pitch into the wind after the high thrust wind event has ended.

2. The method of controlling the wind turbine according to claim 1, wherein receiving the blade load signal comprises measuring the absolute blade load by means of an absolute blade load sensor on the plurality of blades.

3. The method of controlling the wind turbine according to claim 1, wherein receiving the blade load signal comprises estimating the absolute blade load based on a load sensor on the plurality of blades.

4. The method of controlling the wind turbine according to claim 1, wherein the reference load thresholds comprise a fourth load threshold that indicates no event is detected.

5. The method of controlling the wind turbine according to claim 1, wherein generating the second pitch contribution comprises comparing the blade load data and a signal derived from the blade load data with the second load threshold to determine a speed at which the plurality of blades rotate into the wind.

6. The method of controlling the wind turbine according to claim 1, wherein the pitch contribution is a collective pitch contribution sent to each blade of the plurality of blades.

7. The method of controlling the wind turbine according to claim 1, wherein obtaining, processing and generating are repeated regularly.

8. The method of controlling the wind turbine according to claim 1, wherein the high thrust wind event is a coherent gust event.

9. The method of controlling the wind turbine according to claim 1, wherein the method further comprises dispatching the pitch contribution to a pitch actuation system.

10. The method of controlling the wind turbine according to claim 1, wherein the pitch contribution is determined as a function of a gradient of the blade load data.

11. A wind turbine comprising:
    a plurality of blades attached to a rotor hub, the plurality of blades configured to pitch relative to the hub, wherein the plurality of blades comprise a load sensor for providing a blade load signal comprising blade load data on an absolute load on the plurality of blades; and
    a load control system configured to:
    process the blade load data to detect a high thrust wind event, wherein detecting the high thrust wind event comprises receiving a load sum signal indicative of a sum of blade load moments of the plurality of blades of the wind turbine and comparing at least one of the load sum signal and one or more signals derived from the load sum signal to reference load thresholds, wherein a first load threshold of the reference load thresholds sets a minimum moment limit for minimizing false high thrust detection, wherein a second load threshold of the reference load thresholds indicates a start of the high thrust wind event, and wherein a third load threshold of the reference load thresholds indicates an end of the high thrust wind event, wherein the third load threshold is derived from the second load threshold, and wherein the third load threshold is less than the second load threshold;
    generate, in response to the blade load data exceeding the second load threshold, a first control signal comprising a first pitch contribution for affecting the plurality of blades to pitch out of the wind in response to the detected high thrust wind event, and
    generating, in response to the blade load data dropping below the third load threshold, a second control signal comprising a second pitch contribution affecting the plurality of blades to pitch into the wind after the high thrust wind event has ended.

12. The wind turbine according to claim 11, wherein the load control system comprises a P-, PI or PID-controller.

13. The wind turbine according to claim 11, wherein the load sensor is an absolute load sensor.

14. The wind turbine according to claim 13, wherein the absolute load sensor is a calibrated and temperature compensated optical strain gauge.

15. The wind turbine according to claim 14, wherein each of the plurality of blades of the wind turbine comprises a respective absolute blade load sensor placed an equal distance from the hub.

16. A control system for controlling a wind turbine according to the method of claim 1.

17. A computer program product comprising at least one non-transitory computer readable medium containing a program which, when executed by one or more computer processors, performs an operation comprising:

receiving a blade load signal comprising blade load data on an absolute load on a plurality of blades attached to a rotor hub of a wind turbine, processing the blade load data to detect a high thrust wind event, wherein detecting the high thrust wind event comprises receiving a load sum signal indicative of a sum of blade load moments of the plurality of blades of the wind turbine and comparing at least one of the load sum signal and one or more signals derived from the load sum signal to reference load thresholds, wherein a first load threshold of the reference thresholds sets a minimum moment limit for minimizing false high thrust detection, wherein a second load threshold of the reference load thresholds indicates a start of the high thrust wind event, and wherein a third load threshold of the reference load thresholds indicates an end of the high thrust wind event, wherein the third load threshold is derived from the second load threshold, and wherein the third load threshold is less than the second load threshold;

generating, in response to the blade load data exceeding the second load threshold, a first control signal comprising a first pitch contribution for affecting the plurality of blades to pitch out of the wind, and generating, in response to the blade load data dropping below the third load threshold, a second control signal comprising a second pitch contribution affecting the plurality of blades to pitch into the wind after the high thrust wind event has ended.

* * * * *